(12) United States Patent
List et al.

(10) Patent No.: US 12,744,447 B2
(45) Date of Patent: Sep. 22, 2026

(54) STEP-DOWN VOLTAGE REGULATOR

(71) Applicant: Robert Bosch Gmbh, Stuttgart (DE)

(72) Inventors: Carsten List, Walheim (DE); Hartmut Schumacher, Freiberg (DE); Ashraf Kamel, Reutlingen (DE); Roman Vasylenko, Reutlingen (DE); Ruediger Karner, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 331 days.

(21) Appl. No.: 18/571,503

(22) PCT Filed: May 23, 2022

(86) PCT No.: PCT/EP2022/063909
§ 371 (c)(1),
(2) Date: Feb. 26, 2024

(87) PCT Pub. No.: WO2022/263113
PCT Pub. Date: Dec. 22, 2022

(65) Prior Publication Data

US 2024/0291373 A1 Aug. 29, 2024

(30) Foreign Application Priority Data

Jun. 16, 2021 (DE) ..................... 10 2021 206 147.8

(51) Int. Cl.
*H02M 1/00* (2006.01)
*G05F 1/575* (2006.01)
*H02M 3/158* (2006.01)

(52) U.S. Cl.
CPC .......... *H02M 1/0045* (2021.05); *G05F 1/575* (2013.01); *H02M 1/0009* (2021.05); *H02M 3/158* (2013.01)

(58) Field of Classification Search
CPC .. H02M 1/0045; H02M 1/0009; H02M 3/158; H02M 3/156; H02M 1/0003; G05F 1/575
See application file for complete search history.

(56) References Cited

U.S. PATENT DOCUMENTS 6,452,368 B1 9/2002 Basso et al.
7,508,176 B2 3/2009 Hartular et al.
(Continued)

FOREIGN PATENT DOCUMENTS

JP S5875004 U 5/1983
JP 2014207741 A 10/2014

OTHER PUBLICATIONS

International Search Report for PCT/EP2022/063909, Issued Sep. 2, 2022.

*Primary Examiner* — Kyle J Moody
(74) *Attorney, Agent, or Firm* — NORTON ROSE FULBRIGHT US LLP

(57) ABSTRACT

A step-down voltage regulator. The step-down voltage regulator includes a configurable integrated switch circuit, which includes a configurable analysis and control unit, a configurable actuation circuit, compensation circuit, and controllable semiconductor switch, and includes an external wiring with different components. The wiring is electrically connected to connections of the integrated switch circuit. A feedback signal representing an output voltage that can be tapped at an output of the integrated switch circuit is fed back to the analysis and control unit, which generates a switch signal in combination with the actuation circuit based on the feedback signal and outputs it to the controllable semiconductor switch such that a closed control loop for regulating the output voltage is produced from an input voltage applied to an input of the integrated switch circuit. The output voltage maximally has the voltage level of the input voltage.

16 Claims, 1 Drawing Sheet

(56) References Cited

U.S. PATENT DOCUMENTS

| | | | | |
|---|---|---|---|---|
| 8,823,341 | B2 | 9/2014 | Polarouthu et al. | |
| 2008/0258687 | A1 | 10/2008 | So et al. | |
| 2010/0127666 | A1* | 5/2010 | Ball | H02J 7/007194 320/152 |
| 2012/0161732 | A1* | 6/2012 | Renton | H02M 3/156 323/275 |
| 2014/0111169 | A1* | 4/2014 | Polarouthu | H03F 3/45183 323/271 |
| 2015/0042300 | A1 | 2/2015 | Peker et al. | |

* cited by examiner

STEP-DOWN VOLTAGE REGULATOR

FIELD

The present invention relates to a step-down voltage regulator having an integrated switch circuit that can be used, for example, in a vehicle system to generate internal system voltages.

BACKGROUND INFORMATION

Current control devices for airbag systems use a plurality of internal supply voltages that are generated within the control device by an integrated power supply. In this case, voltage regulators are used, which can be designed, for example, as step-up switch converters (boosts), step-down switch converters (bucks) and/or linear regulators (LDO: low drop-out). Linear regulators can be used as step-down voltage regulators for extra-low voltages, for example in the range of 2 to 5 V, or the like, having low output powers of less than 500 mW. Their simple design allows for a cost-effective circuit with simple regulation without coils and diodes. However, the efficiency thereof is low. At higher output powers of more than 700 mW, step-down switch converters can be used as step-down voltage regulators. These allow for highly efficient supply solutions with very high efficiencies of more than 90% in some cases. Their relatively complex design with complex regulation requiring additional wiring with coils and diodes for compensation makes them comparatively expensive to use. In addition, the regulation is highly dependent on external components of the additional wiring. Which step-down voltage regulator to use in which application must be defined early in the design phase of the overall system, because it has a significant influence on the layout of printed circuit boards, total power loss, thermal behavior, etc. Flexible adaptation of the step-down voltage regulator variants in existing designs, which, for example, specify a defined overall architecture with an existing printed circuit board layout, is currently not possible by simple loading and/or wiring changes. It is therefore not possible to scale the output power of the step-down voltage regulator as a function of the system size and/or system functionality. The specification of a switch converter or a linear regulator as a step-down voltage regulator is defined as a function of the system requirements and can then no longer be changed.

The high cost pressure in the field of the vehicle electronics systems means that, among other things, the dimensioning of the electrical circuits is very strongly adapted to the specific application, leaving only a small "reserve" in terms of higher performance. For example, for current control devices of airbag systems, this means that the circuits used to supply voltage to the system are very strongly limited to the defined load situations.

SUMMARY

A step-down voltage regulator having features of the present invention may have an advantage of allowing flexible adaptation of the step-down voltage regulator to the power requirements at the output of the integrated switch circuit, thereby keeping the system costs and the amount of modification required as low as possible. Very good scalability of a corresponding internal power supply for a control device and of the overall system is thus possible in the simplest manner.

According to an example embodiment of the present invention, a step-down voltage regulator having an integrated switch circuit is provided, which step-down voltage regulator can operate both as a step-down switch converter and as a linear regulator. The integrated switch circuit is designed in such a way that both the function of a linear regulator and the function of a step-down switch converter can be realized by simply adapting the components of the external wiring and by correspondingly configuring the integrated switch circuit, for example by means of programming, pin coding, or the like. It is thus cost-effectively possible to use the same system architecture (hardware circuit, printed circuit board) to extend the performance of the corresponding internal power supply in a very simple manner. "Small" systems in which the step-down voltage regulator provides a low output power of less than 500 mW can thus operate the integrated switch circuit as a linear regulator that is externally wired only to a stabilizing capacitor. "Large" systems, in which the step-down voltage regulator provides a high output power of more than 700 mW, operate the integrated switch circuit as a more powerful step-down switch converter that is externally wired to a coil and a diode in addition to the stabilizing capacitor. The design of the components of the integrated switch circuit is selected such that a high cost advantage is maintained even during operation as a linear regulator.

Example embodiments of the present invention provide a step-down voltage regulator comprising a configurable integrated switch circuit which comprises a configurable analysis and control unit, a configurable actuation circuit, a configurable compensation circuit, and at least one controllable semiconductor switch, and comprising an external wiring with different components, said wiring being electrically connected to connections of the integrated switch circuit. A feedback signal which represents an output voltage that can be tapped at an output of the integrated switch circuit is fed back to the analysis and control unit, which is designed to generate at least one switch signal in combination with the actuation circuit on the basis of the feedback signal and output same to the at least one controllable semiconductor switch such that a closed control loop for regulating the output voltage is produced from an input voltage applied to an input of the integrated switch circuit, said output voltage maximally having the voltage level of the input voltage. The integrated switch circuit functions in combination with the electrically connected external wiring and on the basis of the configuration of the analysis and control unit, the configuration of the actuation circuit, and the configuration of the compensation circuit in a first configuration, as a linear regulator, or in a second configuration, as a step-down switch converter.

Example embodiments of the present invention allow for significantly greater scalability of the corresponding internal power supply of the control device, so that a wide range of output loads and/or output lines can be covered with the same integrated switch circuit. Required adjustments to the electrical circuit of the step-down voltage regulator and to the printed circuit board layout are kept to a minimum. Typically, to operate as a step-down switch converter, only an inductor or storage choke or coil and a free-wheeling diode are added to the existing external wiring for operation as linear regulator, which were already provided for in the printed circuit board layout. The integrated switch circuit itself is switched from operation as a linear regulator to the operation as a step-down switch converter by changing the configuration of its components. The configuration of the analysis and control unit and/or the actuation circuit and/or the compensation circuit as components of the integrated switch circuit can take place, for example, before or during an initial start-up of the integrated switch circuit, for example by means of pin coding or factory programming or system-side programming, for example by SPI by means of a microcontroller of the control device or by reading in an external memory, such as an EEPROM. Depending on the specific embodiment of the integrated switch circuit and the external wiring, the output power of the step-down voltage regulator can be very easily varied, for example by a factor of 3 to 4. For example, a step-down voltage regulator can be realized which, during operation as a linear regulator, provides an output voltage of 3.3 V from an input voltage of 6.7 V at an average current of 200 mA. During operation as a step-down switch converter, the same integrated switch circuit can provide the output voltage of 3.3 V at an average current of 600 mA. In the overall system, it is thus very easy to add additional loads, such as further sensors, more powerful microcontrollers, communication interfaces, to the existing architecture of the internal power supply. No new integrated switch circuits have to be added, but rather it is sufficient to switch the current integrated switch circuit from operation as a linear regulator to operation as a step-down switch converter and to add the necessary passive components to the external wiring.

In the present case, the analysis and control unit can be understood to mean an electrical circuit that can be used, for example, in a control device, in particular in an airbag control device. The analysis and control unit receives the feedback signal and analyzes it in order to accordingly activate or deactivate the actuation circuit of the at least one controllable semiconductor switch. For this purpose, the analysis and control unit can have at least one corresponding interface.

Advantageous improvements of the step-down voltage regulator, which are disclosed herein, are possible by means of the measures and developments set out herein.

According to an example embodiment of the present invention, it is particularly advantageous that the external wiring can comprise a shorting bridge and a capacitor as components in the first configuration of the integrated switch circuit as a linear regulator. In this case, the shorting bridge can connect a node of the integrated switch circuit at which a high-side voltage can be tapped to an output of the integrated switch circuit at which the output voltage can be tapped. The capacitor can be looped in between the output of the integrated switch circuit and a reference potential and stabilize the output voltage via the connected load. This allows a simple implementation of the step-down voltage regulator with an integrated switch circuit acting as a linear regulator.

In an advantageous embodiment of the step-down voltage regulator according to the present invention, the external wiring in the second configuration of the integrated switch circuit as a step-down switch converter can comprise an inductor, a diode, and a capacitor as components. In this case, the inductor can, as an alternative to the shorting bridge, connect the node of the integrated switch circuit at which the high-side voltage can be tapped to the output of the integrated switch circuit at which the output voltage can be tapped. The diode can be looped in between the node of the integrated switch circuit and the reference potential and act as a free-wheeling diode. Analogous to the operation of the integrated switch circuit, the capacitor can be looped in as a linear regulator between the output of the integrated switch circuit and the reference potential. This allows a simple implementation of the step-down voltage regulator with an integrated switch circuit acting as a step-down switch converter.

In a further advantageous embodiment of the step-down voltage regulator of the present invention, the analysis and control unit in the first configuration of the integrated switch circuit as a linear regulator can act as a differential amplifier, which compares the feedback signal to a reference signal and, in combination with the actuation circuit, which in the first configuration of the integrated switch circuit as a linear regulator can act as a drive circuit, can generate the actuation signal for the at least one semiconductor switch. In this case, the compensation circuit may have no function in the first configuration of the integrated switch circuit as a linear regulator.

In a further advantageous embodiment of the step-down voltage regulator of the present invention, the analysis and control unit in the second configuration of the integrated switch circuit as a step-down switch converter can act as a comparator, which compares the feedback signal to a reference signal and, in combination with the actuation circuit, which in the second configuration of the integrated switch circuit as a step-down switch converter can act as a PWM modulator (PWM: pulse width modulation) and drive circuit, can generate the at least one switch signal for the at least one controllable semiconductor switch. In this case, the compensation circuit in the second configuration of the integrated switch circuit as a step-down switch converter can stabilize the analysis and control unit when the at least one switch signal is generated. In addition, the analysis and control unit can output a first signal to the PWM modulator of the actuation circuit when the feedback signal is smaller than the reference signal, and output a second signal to the PWM modulator of the actuation circuit when the feedback signal is greater than the reference signal. In combination with the drive circuit, the PWM modulator of the actuation circuit can then change the at least one switch signal based on the first signal such that the output voltage increases, or change the at least one switch signal based on the second signal such that the output voltage decreases. Because the at least one switch signal is generated as a PWM signal (pulse width modulation signal), the output voltage can be regulated with high efficiency.

In a further advantageous embodiment of the step-down voltage regulator of the present invention, a current sensor circuit can be designed to detect a value of a current flowing through the at least one controllable semiconductor switch and to output a corresponding measurement signal to the analysis and control unit, which is designed to take into account the detected value of the current flowing through the at least one controllable semiconductor switch when the at least one switch signal is generated for the at least one semiconductor switch. It is thereby possible to set the desired output voltage more precisely. In addition, the at least one semiconductor switch can be switched off if the detected current value becomes too high.

In a further advantageous embodiment of the step-down voltage regulator of the present invention, the output voltage or a portion of the output voltage can be fed back as a feedback signal. For example, the output voltage can be applied to a corresponding connection of the integrated switch circuit in the form of a direct connection. Alternatively, the output voltage can be fed back via an external or internal voltage divider.

In a further advantageous embodiment of the step-down voltage regulator of the present invention, a dimensioning of the at least one semiconductor switch can be adapted to the current requirements and/or dropout voltage requirements of the linear regulator in the first configuration of the integrated switch circuit. For example, a layout area and a volume resistivity of the at least one controllable semiconductor switch can be adapted to the current requirements and/or dropout voltage requirements of the linear regulator in the first configuration of the integrated switch circuit. During operation of the integrated switch circuit as a step-down switch converter, a significantly higher output power can be achieved using the same at least one controllable semiconductor switch due to the timing (set pulse/pause ratio) of the switch signal applied as a PWM signal.

In a further advantageous embodiment of the step-down voltage regulator of the present invention, a layout of the step-down voltage converter can provide contact points for the different components of the external wiring of the integrated switch circuit. As a result, it is possible to quickly switch between the first configuration of the integrated switch circuit as a linear regulator and the second configuration of the integrated switch circuit as a step-down switch converter.

One exemplary embodiment of the present invention is illustrated in the figures and explained in more detail in the following description. In the figures, identical reference signs denote components or elements which perform the same or analogous functions.

DETAILED DESCRIPTION OF EXAMPLE EMBODIMENTS

Figure 1:
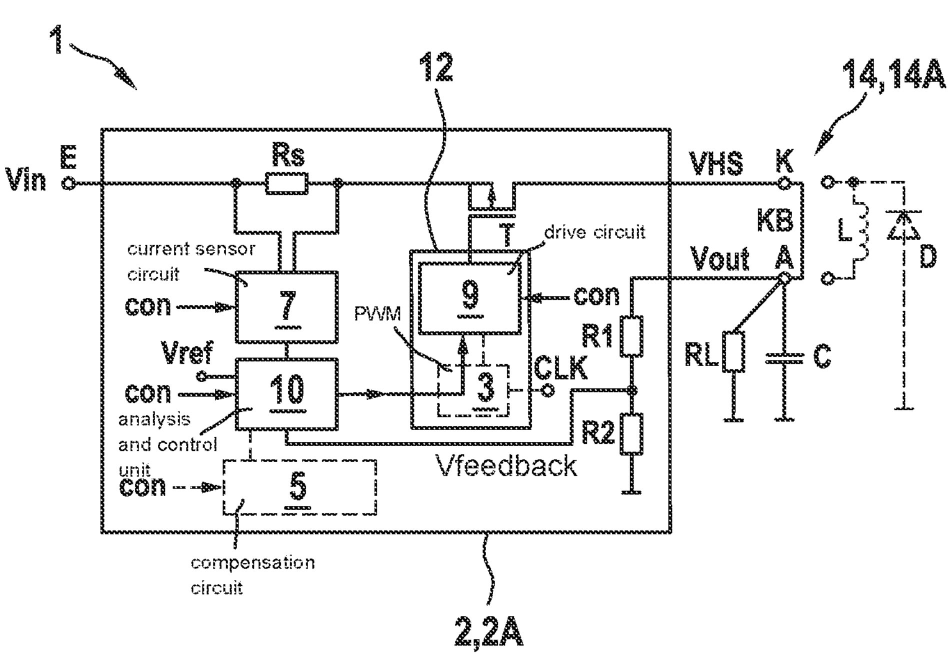
FIG. 1 shows a schematic block diagram of an exemplary embodiment of a step-down voltage regulator according to the present invention with an integrated switch circuit that acts as a linear regulator.
Figure 2:
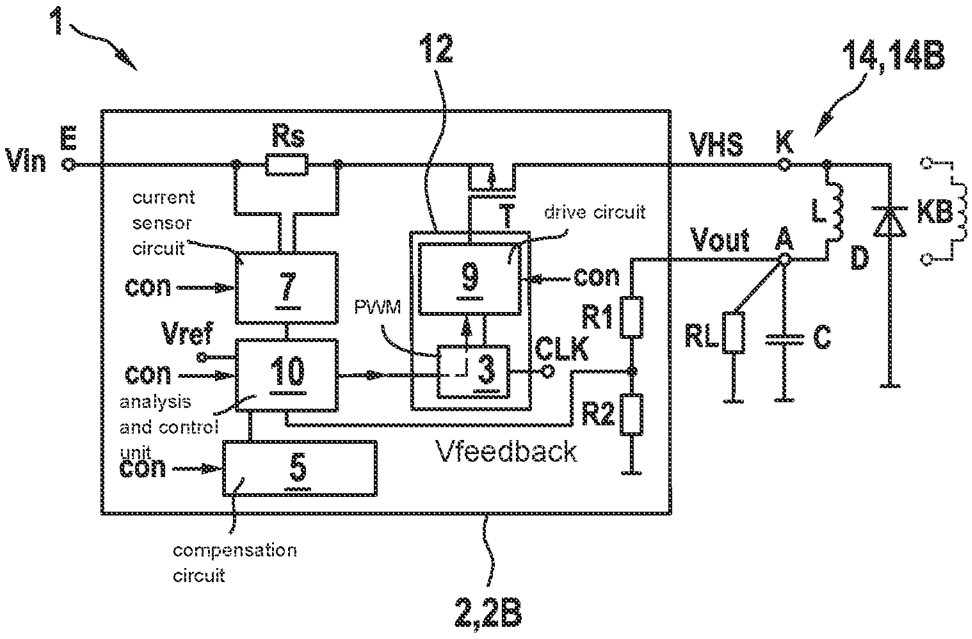
FIG. 2 shows a schematic block diagram of the step-down voltage regulator according to an example embodiment of the present invention with an integrated switch circuit that acts as a step-down switch converter.

As can be seen from FIGS. 1 and 2, the illustrated exemplary embodiment of a step-down voltage regulator 1 according to the present invention comprises a configurable integrated switch circuit 2, which comprises a configurable analysis and control unit 10, a configurable actuation circuit 12, a configurable compensation circuit 5, and at least one controllable semiconductor switch T, and an external wiring 14 with different components, said wiring being electrically connected to connections of the integrated switch circuit 2. In this case, a feedback signal Vfeedback which represents an output voltage Vout that can be tapped at an output A of the integrated switch circuit 2 is fed back to the analysis and control unit 10. The analysis and control unit 10 generates at least one switch signal in combination with the actuation circuit 12 on the basis of the feedback signal Vfeedback and outputs same to the at least one controllable semiconductor switch T such that a closed control loop for regulating the output voltage Vout is produced from an input voltage Vin applied to an input E of the integrated switch circuit 2, said output voltage maximally having the voltage level of the input voltage Vin. The integrated switch circuit 2 functions in combination with the electrically connected external wiring 14 and on the basis of the configuration of the analysis and control unit 10, the configuration of the actuation circuit 12, and the configuration of the compensation circuit 5 in a first configuration shown in FIG. 1, as a linear regulator 2A, or in a second configuration shown in FIG. 2, as a step-down switch converter 2B.

As can further be seen from FIGS. 1 and 2, the integrated switch circuit 2 in the exemplary embodiment shown comprises only one controllable semiconductor switch T designed as a PMOSFET. Of course, other suitable electrical components can also be used as controllable semiconductor switches 1. In addition, the output A of the integrated switch circuit 2 is loaded with a load RL, shown here as an ohmic resistor. Of course, inductive or capacitive loads or any desired mixed forms of inductive or capacitive or ohmic loads are also possible. In addition, the external wiring 14 comprises a capacitor C for stabilizing the output voltage Vout independently of the operating mode of the integrated switch circuit 2.

As can further be seen from FIG. 1, in the first configuration of the integrated switch circuit 2 as a linear regulator 2A, the external wiring 14A comprises an additional shorting bridge KB. The shorting bridge KB connects a node K of the integrated switch circuit 2 at which a high-side voltage VHS can be tapped to an output A of the integrated switch circuit 2 at which the output voltage Vout can be tapped. The capacitor C is looped in between the output A of the integrated switch circuit 2 and a reference potential.

As can further be seen from FIG. 2, in the second configuration of the integrated switch circuit 2 as a step-down switch converter 2B, the external wiring 14B additionally comprises an inductor L and a diode D. The inductor L connects the node K of the integrated switch circuit 2 at which the high-side voltage VHS can be tapped to the output A of the integrated switch circuit 2 at which the output voltage Vout can be tapped. The diode D acts as a freewheeling diode and is looped in between the node K of the integrated switch circuit 2 and a reference potential. The capacitor C is looped in between the output A of the integrated switch circuit 2 and the reference potential. The dotted representation of the inductor L and the diode D in FIG. 1 and of the shorting bar KB in FIG. 2 is intended to indicate that a layout of the step-down voltage converter 1 shown provides contact points for the different components of the external wiring 14 of the integrated switch circuit 2.

As can further be seen from FIGS. 1 and 2, the actuation circuit 12 in the illustrated exemplary embodiment of the step-down voltage regulator 1 comprises a PWM modulator 3 and a drive circuit 9. Furthermore, a portion of the output voltage Vout is fed back as a feedback signal Vfeedback to the analysis and control unit 10 via a voltage divider that consists of a first resistor R1 and a second resistor R2. In the exemplary embodiment of the step-down voltage regulator 1 shown, a current sensor circuit 7 comprising a shunt Rs detects a value of a current flowing through the controllable semiconductor switch T and outputs a corresponding measurement signal to the analysis and control unit 10. The analysis and control unit 10 takes into account the detected value of the current flowing through the controllable semiconductor switch T when the at least one switch signal is generated for the semiconductor switch T. A dimensioning of the controllable semiconductor switch T, such as a layout area and a volume resistivity, is adapted to the current requirements and/or dropout voltage requirements of the linear regulator 2A in the first configuration of the integrated switch circuit 2.

In the first configuration of the integrated switch circuit 2 as a linear regulator 2A shown in FIG. 1, the analysis and control unit 10 acts as a differential amplifier, which compares the feedback signal Vfeedback to a reference signal Vref and, in combination with the actuation circuit 12, which in the first configuration of the integrated switch circuit 2 as a linear regulator 2A acts only as a drive circuit 9, generates the at least one switch signal for the controllable semiconductor switch T. This means that the PWM modulator 3 and the compensation circuit 5 have no function in the first configuration of the integrated switch circuit 2 as linear regulator 2A. In the exemplary embodiment shown, the reference signal Vref is an internal voltage level. Alternatively, the reference signal Vref can be an external voltage level that is applied to a corresponding reference signal connection of the integrated switch circuit 2.

In the second configuration of the integrated switch circuit 2 as a step-down switch converter 2B shown in FIG. 2, the analysis and control unit 10 acts as a comparator, which compares the feedback signal Vfeedback to the reference signal Vref and, in combination with the actuation circuit 12, which in the second configuration of the integrated switch circuit 2 as a step-down switch converter 2B acts as a PWM modulator 3 and drive circuit 9, generates the at least one switch signal for the controllable semiconductor switch T. In this case, the at least one switch signal is a PWM signal with a set pulse/pause ratio. In order to generate the PWM signal, an internal clock signal CLK is applied to the PWM modulator 3. Due to the timing of the at least one switch signal, a significantly higher output power can be achieved in the second configuration of the integrated switch circuit 2 as a step-down switch converter 2B with the same semiconductor switch T than in the first configuration of the integrated switch circuit 2 as a linear regulator 2A. The compensation circuit 5 in the second configuration of the integrated switch circuit 2 as a step-down switch converter 2B stabilizes the analysis and control unit 10 when the at least one switch signal is generated. The analysis and control unit 10 outputs a first signal to the PWM modulator 3 of the actuation circuit 12 when the feedback signal Vfeedback is smaller than the reference signal Vref, and outputs a second signal to the PWM modulator 3 of the actuation circuit 12 when the feedback signal Vfeedback is greater than the reference signal Vref. Therefore, in combination with the drive circuit 9, the PWM modulator 3 of the actuation circuit 12 changes the at least one switch signal based on the first signal such that the output voltage Vout increases, or such that the output voltage Vout decreases based on the second signal. The changes are achieved by a corresponding change in the pulse/pause ratios of the PWM signal.

The integrated switch circuit 2 itself is switched from operation as a linear regulator 2A to the operation as a step-down switch converter 2B by changing the configuration of its components. By different configurations of the analysis and control unit 10 and/or the actuation circuit 12 and/or the compensation circuit 5 and/or by different voltage levels of the reference signal Vref, the corresponding step-down voltage regulator 1 can be adapted to different requirements regarding the level and the accuracy of the output voltage Vout. The configuration of the analysis and control unit 10 and/or the actuation circuit 12 and/or the compensation circuit 5 as components of the integrated switch circuit 2 can take place, for example, before or during an initial start-up of the integrated switch circuit 2, for example by means of pin coding or factory programming or system-side programming, for example by SPI by means of a microcontroller of the control device or by reading in an external memory, such as an EEPROM.

The invention claimed is:

1. A step-down voltage regulator, comprising:

a configurable integrated switch circuit, which includes a configurable analysis and control unit, a configurable actuation circuit, a configurable compensation circuit, and at least one controllable semiconductor switch; and an external wiring with different components, the wiring being electrically connected to connections of the integrated switch circuit;

wherein:

a feedback signal which represents an output voltage that can be tapped at an output of the integrated switch circuit is fed back to the analysis and control unit, which generates, based on the feedback signal, at least one switch signal in combination with the actuation circuit and outputs the switch signal to the at least one controllable semiconductor switch such that a closed control loop for regulating an output voltage is produced from an input voltage applied to an input of the integrated switch circuit, the output voltage maximally having a voltage level of the input voltage;

the integrated switch circuit comprises a first interface terminal and a second interface terminal;

the external wiring comprises a first external component set and a second external component set, each of which is structured to be selectively and interchangeably connectable between the first interface terminal and the second interface terminal, such that either the first external component set or the second external component set is electrically connected between the first and second interface terminals at a time;

the configurable integrated switch circuit is configured to receive a configuration setting via pin coding or programming by a microcontroller and to enable or disable internal functional circuitry in accordance with the configuration setting;

the configurable integrated switch circuit, when configured in a first configuration in response to the configuration setting and corresponding to connection of the first external component set between the first and second interface terminals, disables a first internal functional component set including at least a portion of the actuation circuit and the compensation circuit and operates as a linear regulator; and the configurable integrated switch circuit, when configured in a second configuration in response to the configuration setting and corresponding to connection of the second external component set between the first and second interface terminals, enables the first internal functional component set and operates as a step-down switch converter.

2. The step-down voltage regulator according to claim 1, wherein the first external component set includes a shorting bridge and a capacitor.

3. The step-down voltage regulator according to claim 2, wherein the shorting bridge connects a node of the integrated switch circuit at which a high-side voltage can be tapped to the output of the integrated switch circuit at which the output voltage can be tapped, and the capacitor is looped in between the output of the integrated switch circuit and a reference potential.

4. The step-down voltage regulator according to claim 1, wherein the second external component set includes an inductor, a diode, and a capacitor.

5. The step-down voltage regulator according to claim 4, wherein the inductor connects a node of the integrated switch circuit at which a high-side voltage can be tapped to the output of the integrated switch circuit at which the output voltage can be tapped, wherein the diode is looped in between the node of the integrated switch circuit and a reference potential, and wherein the capacitor is looped in between the output of the integrated switch circuit and the reference potential.

6. The step-down voltage regulator according to claim 1, wherein the analysis and control unit, in the first configuration of the integrated switch circuit as the linear regulator, acts as a differential amplifier, which compares the feedback signal to a reference signal and, in combination with the actuation circuit, which, in the first configuration of the integrated switch circuit as the linear regulator, acts as a drive circuit, generates the at least one switch signal for the at least one controllable semiconductor switch, wherein the compensation circuit does not have a function in the first configuration of the integrated switch circuit as the linear regulator.

7. The step-down voltage regulator according to claim 1, wherein the analysis and control unit, in the second configuration of the integrated switch circuit as the step-down switch converter, acts as a comparator, which compares the feedback signal to a reference signal and, in combination with the actuation circuit, which in the second configuration of the integrated switch circuit as the step-down switch converter acts as a PWM modulator and drive circuit, generates the at least one switch signal for the at least one controllable semiconductor switch, wherein the compensation circuit in the second configuration of the integrated switch circuit as the step-down switch converter stabilizes the analysis and control unit when the at least one switch signal is generated.

8. The step-down voltage regulator according to claim 7, wherein the analysis and control unit outputs a first signal to the PWM modulator of the actuation circuit when the feedback signal is smaller than the reference signal, and outputs a second signal to the PWM modulator of the actuation circuit when the feedback signal is greater than the reference signal.

9. The step-down voltage regulator according to claim 8, wherein, in combination with the drive circuit, the PWM modulator of the actuation circuit changes the at least one switch signal based on the first signal such that the output voltage increases, or changes the at least one switch signal based on the second signal such that the output voltage decreases.

10. The step-down voltage regulator according to claim 1, wherein a current sensor circuit is configured to detect a value of a current flowing through the at least one controllable semiconductor switch and to output a corresponding measurement signal to the analysis and control unit, which takes into account the detected value of the current flowing through the at least one controllable semiconductor switch when the at least one switch signal is generated for the at least one semiconductor switch.

11. The step-down voltage regulator according to claim 1, wherein the output voltage or a portion of the output voltage, is fed back as the feedback signal.

12. The step-down voltage regulator according to claim 1, wherein a dimensioning of the at least one semiconductor switch is adapted to current requirements and/or dropout voltage requirements of the linear regulator in the first configuration of the integrated switch circuit.

13. The step-down voltage regulator according to claim 1, wherein a layout of the step-down voltage converter provides contact points for the different components of the external wiring of the integrated switch circuit.

14. The step-down voltage regulator according to claim 1, wherein the first internal functional component set includes a pulse width modulator of the actuation circuit and the compensation circuit.

15. The step-down voltage regulator according to claim 1, wherein the first external component set comprises a shorting bridge, and wherein the second external component set comprises an inductor and a diode.

16. The step-down voltage regulator according to claim 15, wherein the first internal functional component set includes a pulse width modulator of the actuation circuit and the compensation circuit.

* * * * *